United States Patent [19]

Rose et al.

[11] Patent Number: 4,741,890

[45] Date of Patent: May 3, 1988

[54] GAS SCRUBBING METHOD

[75] Inventors: Jean T. Rose, Fairless Hills, Pa.; J. Michael Stockman, Minneapolis, Minn.

[73] Assignee: Betz Laboratories, Inc., Trevose, Pa.

[21] Appl. No.: 889,651

[22] Filed: Jul. 24, 1986

[51] Int. Cl.$^4$ .............................................. C01B 17/00
[52] U.S. Cl. .................... 423/242; 252/351
[58] Field of Search .......... 423/244 A, 244 R, 242 A, 423/242 R; 252/351

[56] References Cited

U.S. PATENT DOCUMENTS

| | | | |
|---|---|---|---|
| 3,433,739 | 3/1969 | Neuman | 210/58 |
| 3,518,204 | 6/1970 | Hansen et al. | 252/181 |
| 3,520,813 | 7/1970 | Hansen et al. | 252/85 |
| 4,134,854 | 1/1979 | Milligan | 252/351 |
| 4,409,192 | 10/1983 | Lichtner et al. | 423/242 |
| 4,410,447 | 11/1983 | Decker et al. | 252/351 |

OTHER PUBLICATIONS

Betz Handbook of Industrial Water Conditioning, 6 ed., 1962, pp. 160–161.

*Primary Examiner*—Gregory A. Heller
*Attorney, Agent, or Firm*—Alexander D. Ricci

[57] ABSTRACT

The present invention is directed to a method of removing sulfur dioxide from flue gases derived from furnaces burning high sulfur content fuels. The method comprises spraying flue gases with an aqueous medium containing (i) a material either dissolved or slurried therein, which material reacts with the sulfur dioxide in the flue gas to produce calcium sulfate and calcium sulfite, and (ii) a sufficient amount of a water-soluble surfactant (surface active agent) or mixtures thereof to improve sulfur dioxide removal.

8 Claims, No Drawings

GAS SCRUBBING METHOD

BACKGROUND OF THE INVENTION

During recent years, the number of wet scrubber systems installed to remove gaseous and particulate material from stack gases has increased tremendously. These wet scrubbers are being used to clean effluent from boiler stacks, incinerator stacks, limekilns, foundries, blast furnaces, basic oxygen furnaces (BOF), open hearth units, coke plants, paper mill recovery boilers, pet food manufacturing facilities, electric furnaces (steel and aluminum), smelters, asphalt plants and many others.

One of the most important features of a scrubber system is the contact chamber, the device used to effect transfer of gaseous and/or particulate matter from the gas to the liquid phase. Most wet scrubber systems involve a venturi, a packed bed, an orifice plate, a spray chamber, flooded trays or a turbulent bed. Some systems even use two contact chambers in series, for example, a venturi followed by a spray chamber.

Venturi or orifice plate scrubbers are generally more efficient for particulate removal while packed beds, turbulent beds, flooded trays and spray chambers are usually more efficient for removing gaseous components such as $SO_2$ and HF.

The present invention is directed specifically to those scrubber systems where scaling and deposition problems due to insoluble calcium sulfate and calcium sulfite are encountered. The type of problem which the present invention minimizes is that which is usually found in gas scrubber systems of utility boilers, incinerators or, for that matter, any furnace or boiler system where high sulfur fuels are used and, in particular, where the scrubber systems utilize a wet lime or limestone process.

The flue gas generated by a utility boiler, for example, contains, in addition to the fly ash pollutant, $SO_2$ and $SO_3$ gases. These components must be removed before the flue gas is discharged into the atmosphere. Various systems have been used for this purpose, among which may be mentioned the wet sodium carbonate and the wet lime and limestone scrubber systems. In both of these systems excessive calcium sulfate and calcium sulfite formation can be a problem. With the use of lime and limestone, the formation of the calcium sulfite is a necessary requirement for the scrubber system to be effective.

In these systems, lime or limestone is added to the scrubber in slurry form. The limestone slurry is stored in a recycle tank which supplies the absorber tower pumps. These pumps supply the limestone slurry to the top of the absorber tower. The slurry is allowed to cascade downward as the incoming flue gas moves upward. Ideally, turbulent contact between the slurry and gas should be maximized and efficient $SO_2$ removal should occur.

Sulfur oxides are absorbed and precipitated as calcium salts which, after being separated from the liquid, are either discarded as solid waste or sold for use as wall board fillers and other recycle products. The water which is saturated with respect to calcium sulfite and sulfate is recycled. Closed-loop operation is desired to avoid the discharge of the high solids content water and to enhance $SO_2$ absorption. The closed-loop operation increases the scaling problem by increasing the supersaturation inside the lime or limestone scrubber. The scale usually consists of $CaSO_4$ and $CaSO_3$.

The obvious objective in any system as described is to obtain the most effective removal of the sulfur dioxide gases at the least amount of either equipment or capital costs and/or chemical costs.

With these objectives in mind, industry is continually investigating, designing and developing techniques and chemical materials in an attempt to achieve better sulfur dioxide removal to assure that the regulatory standards are met or adhered to as closely as possible.

GENERAL DESCRIPTION OF THE INVENTION

The present inventors discovered that sulfur dioxide removal efficiency was enhanced by the use of a certain class of materials. More specifically, it was determined that in a process for scrubbing flue gases containing sulfur dioxide for the removal thereof involving (1) contacting the flue gases with an aqueous medium containing a material which will react with the sulfur dioxide to form either calcium sulfate or calcium sulfite or both; and (2) separating the insoluble either calcium sulfate or calcium sulfite or both from the aqueous medium, significant improvements over what was previously achieved could be obtained by including in the aqueous medium a water-soluble surfactant (surface active agent) or mixtures thereof in a quantity sufficient to achieve the enhanced removal.

Surfactant (surface active agent), in context of the present invention, means any compound that affects (usually reduces) surface tension when dissolved in water or water solutions. These materials are well-known and commercially available. Specific families of surfactants include Pluronic ®, Tergitol ®, Sulfonic ® series products. The Pluronic series include the polyoxypropylene-polyoxyethylene block copolymers such as $HO(CH_2CH_2O)_3(CH_3CH_2CH_2O)_{30}(CH_2CH_2O)_3H$ (Pluronic L-61). The Tergitol series products include the surfactants such as alkyl; more specifically, octylphenoxy poly(ethoxy)ethanol; nonyl phenol polyethylene glycol ether and the like. The Sulfonic series include alkyl ($C_1$–$C_{10}$) phenol polyethylene oxide materials such as

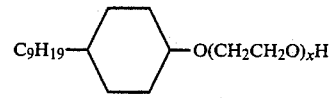

where X=1 to 40. Sulfonic N-95 is the nonyl phenol/X=9.5 product. It is postulated in view of the success obtained with certain surfactants that this family of chemicals would be effective in accordance with the present invention.

The surfactant can be added to the scrubbing medium in an amount of 0.1 to 50 ppm, with 1 to 30 ppm being preferred.

The exact mechanism by which the surfactants operate to enhance sulfur dioxide removal is not understood; however, as illustrated by the field trial described hereinafter, the results achieved by including such were impressive.

FIELD TRIAL

| Product 1 | % by Weight |
|---|---|
| Surfactant 1* | 15.00 |

-continued

| Product 1 | % by Weight |
|---|---|
| Surfactant 2** | 5.00 |
| Ethylene Glycol | 0.125 |
| NaOH | 0.025 |
| Silicone Emulsion Antifoam | 0.025 |
| Water | 76.85 |

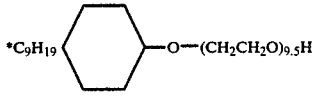

The utility is a 200 MW coal-fired power plant located in the Midwest. Built in 1976, the utility burns coal that contains 3.5% sulfur, which requires extensive particulate and $SO_2$ control.

Flue gas from the boiler passes to an electrostatic precipitator for fly ash removal. Gas then goes to two scrubber modules that each consist of a "presaturator" section followed by a tray scrubber section. This tray section consists of three levels of orifice trays that carry a liquid level of limestone slurry. The limestone slurry reacts with $SO_2$ to form predominantly calcium sulfite and calcium sulfate compounds. "Clean" gas flows out of each scrubber module, through a mist eliminator section and then to the stack, where the final gas $SO_2$ concentration is measured.

This system has experienced extensive problems over its operating life with violation of $SO_2$ compliance limits and severe scaling of module internals. For several years the plant has been using high levels of organic acids (adipic and dibasic) to increase the system $SO_2$ removal—this barely keeps them in compliance, at an excessive operating cost. (The plant must meet an $SO_2$ emissions limit of 1.2 lbs $SO_2$ per million BTU's burned.)

A trial was conducted using Product 1. This product is a blend of nonionic surfactants that has been effective in improving scrubbing efficiency in particulate scrubbers. It has been theorized that the surfactant product increases liquid atomization and reduces droplet size by reducing overall surface tension of the scrubbing liquid. In addition, there appears to be an effect on the "wetting" ability of the liquid, again due to reduced surface tension.

Baseline $SO_2$ concentrations, pH, opacity, slurry solids and other system parameters were monitored prior to the use of Product 1. $SO_2$ emission levels ranged from 1.09 lbs/MM BTU's to 1.21 lbs/MM BTU's. Immediately after the Product 1 feed was initiated, $SO_2$ emissions dropped and ranged from 0.85–0.92 lbs/MM BTU's. These emissions concentrations were maintained steadily for 40 minutes—the feedrate of Product 1 ranged from 10–30 ppm (2–6 ppm surfactant).

Product 1 addition was then discontinued. After 10 minutes (the approximate turnover time in the recycle tank), $SO_2$ emissions began to rise. After 50 minutes from the last Product 1 addition, $SO_2$ emissions had returned to a range of 1.15–1.30 lbs/MM BTU's. There was no observable effect on slurry pH or stack opacity. There did appear to be a reduction in measured percent solids and a significant increase in total absorber slurry flow.

Having described our invention, what we claim is:

1. In a process for scrubbing flue gases containing sulfur dioxide for the removal thereof which comprises (1) contacting the flue gases with an aqueous medium containing a material which will react with the sulfur dioxide to form either calcium sulfate or calcium sulfite or both; and (2) separating the insoluble either calcium sulfate or calcium sulfite or both from the aqueous medium, the improvement being adding to said aqueous medium prior to contact with the gas a water-soluble surfactant in an amount sufficient to increase sulfur dioxide removal, said surfactant is selected from the group consisting of a polyoxypropylene polyoxyethylene block polymer, alkyl phenol polyethylene oxide polymer, alkyl phenoxy polyethoxyethanol polymer, alkyl phenol polyethylene glycol ether polymer, and alkyl phenol polyethylene oxide polymer.

2. A method according to claim 1 wherein the surfactant is added to said medium in an amount of 0.1 to 50 ppm.

3. A method according to claim 2, wherein a mixture of surfactants are added.

4. A method according to claim 3 wherein the surfactant is a mixture of an alkyl phenol polyethylene oxide polymer and a polyoxypropylene-polyoxyethylene polymer.

5. In a process for scrubbing flue gases containing sulfur dioxide for removal thereof which comprises (1) contacting the flue gases with an aqueous medium containing limestone which will react with the sulfur dioxide to form water-insoluble particles of calcium sulfate or calcium sulfite or both; and (2) separating the insoluble particles from the aqueous medium, the improvement being adding to said aqueous medium a water-soluble surfactant in an amount sufficient to increase sulfur dioxide removal wherein the surfactant is selected from the group consisting of a polyoxy-propylene-polyoxyethylene block polymer, alkyl phenol polyethylene oxide polymer, alkyl phenoxy polyethoxyethanol polymer, alkyl phenol polyethylene glycol ether polymer, and alkyl phenol polyethylene oxide polymer.

6. A method according to claim 5 wherein the surfactant is added to said medium in an amount of 0.1 to 50 ppm.

7. A method according to claim 6 wherein a mixture of surfactants are added.

8. A method according to claim 7 wherein the surfactant is a mixture of an alkyl phenol polyethylene oxide polymer and a polyoxypropylene-polyoxyethylene polymer.

* * * * *